United States Patent [19]

Faulconer

[11] 4,296,594
[45] Oct. 27, 1981

[54] FRUIT PICKER

[76] Inventor: Richard J. Faulconer, P.O. Box 164, Barstow, Calif. 92311

[21] Appl. No.: 156,045

[22] Filed: Jun. 3, 1980

Related U.S. Application Data

[63] Continuation-in-part of Ser. No. 92,321, Nov. 8, 1979.

[51] Int. Cl.³ .............................................. A01D 46/24
[52] U.S. Cl. ....................................................... 56/336
[58] Field of Search ................................ 56/332–340; 30/241

[56] References Cited

U.S. PATENT DOCUMENTS

| | | | |
|---|---|---|---|
| 1,209,999 | 12/1916 | Powers | 30/241 |
| 1,746,232 | 5/1929 | Ossino | 56/336 |
| 2,629,927 | 3/1953 | Hartwell | 30/241 |
| 3,507,107 | 4/1970 | Harms et al. | 56/336 |
| 3,559,387 | 2/1971 | Myers | 56/334 |
| 3,857,227 | 12/1974 | Rosenberg | 56/335 |
| 3,902,306 | 9/1975 | Rosenberg | 56/333 |
| 4,095,399 | 6/1978 | Faulconer | 56/336 |

Primary Examiner—Robert A. Hafer
Attorney, Agent, or Firm—Doris Drucker

[57] ABSTRACT

A hand-held fruit picker comprises an elongated rigid tube which is surmounted at one end by a cylindrical lattice cage coaxially communicating with the tube bore. A double-bladed knife which is slidably supported on the top of the lattice cage proximate to fruit-stem receiving channels, is constrained to move reciprocally in a plane perpendicular to the tube and lattice axes. Force transmitting means connect the knife with a pivotable lever that is mounted in a handle attached to the exterior of the tube. When the lever is squeezed against the handle the knife is retracted a distance sufficient to move the cutting edges of the knife blades across the channels and to slice through fruit stems held therein. The severed fruit falls into the tube and a flexible chute which depends from the lower end of the tube, and from which the fruit can be discharged into a container on the ground. Segments of fiber rope, led through diametrically opposite perforations in the tube wall, criss-cross the bore and are adjustably fastened to the exterior of the tube.

12 Claims, 6 Drawing Figures

FRUIT PICKER

This application is a continuation-in-part of my co-pending application Ser. No. 92,321 filed on Nov. 8, 1979.

PRIOR ART STATEMENT

The distinctive features of the present invention are:

1. An elongated fruit conducting tube, surmounted at one end by a cylindrical lattice cage which forms a continuation of the tube and facilitates sighting of fruit on a tree.
2. A flexible sleeve attached to the opposite end of the tube to facilitate the collection and discharge of fruit.
3. A double bladed cutting knife mounted on top of the lattice cage and constrained to move slidably and reciprocally in a plane which is perpendicular to the longitudinal tube and lattice cage axes.
4. Resilient means connecting the knife and the lattice top.
5. A lever disposed on a handle which is attached to the tube and force transmitting means connecting the lever with the knife, so that actuation of the lever causes movement of the knife in one predetermined direction.
6. A pair of outwardly opening channels in the top of the lattice cage for receiving and immobilizing stems of fruit therein. In operation the knife blades move simultaneously across the channels and slice through fruit stems held therein.
7. Detachable and adjustable decelerators in the interior of the tube to slow the descent of fruit therethrough.
8. Detachable and adjustable attachment means for the lattice cage and the sleeve at opposite ends of the tube to permit their interchangeable use on tubes of different diameters suitable for fruit of different size.

The above construction is not shown in prior art, viz:

U.S. Pat. No. 64,472: A flexible bag hands from a pole and has an upper rim which is reinforced by rigid members. By pulling on a string the rigid members move toward one another, closing the mouth of the bag and entrapping the fruit therein.

U.S. Pat. No. 296,514: A fruit collector in the form of a bag hands from a pole which has at its upper end outwardly projecting plier-like cutters.

U.S. Pat. No. 351,824: A combination of a staff or handle with a fruit receiver at one end is surmounted by a pair of jaws with cutting edges which can be opened by actuation of a lever. The cutting means project outwardly of the fruit receiver which is a cylindrical box that has to be inverted for the discharge of fruit.

U.S. Pat. No. 850,355: A flexible bag depends from a pole and has two bowed knives projecting upwardly and outwardly of the bag.

U.S. Pat. No. 1,223,601: A fruit collector depends from a pole and has a closure flap at its open bottom which can be engaged, respectively disengaged, during the fruit picking and gathering operation. Outwardly extending gripping means at the upper end of the collector are intended to guide fruit into the collector.

U.S. Pat. No. 2,406,055: A pole carries a funnel-chaped chute from which detached fruit is carried into a fabric bag, also depending from the pole. From the fabric bag fruit is discharged through the bottom into a bucket which can be slid up and down the pole. The fruit picking element consists of outwardly projecting flaring fingers which are adapted to straddle the fruit stem. By pulling the picker element downwards the fruit is broken loose off its stem or branch.

U.S. Pat. No. 3,559,387: A vacuum pump sucks fruit off the tree into a hollow canister which is in vacuum communication with the pump.

U.S. Pat. No. 3,398,038: A fruit conducting sleeve which is coextensive with and depending from a pole has on its exterior elastic bands adapted to constrict its cross-sectional area in order to decelerate the descent of the fruit. The cutting means which project out of the fruit picker consist of a movable member actuatable to scissor against an anvil portion of a support member to sever the stem of fruit trapped in a slot in the cutter. In the above invention, by contrast, a fruit stem trapping inlet is provided in the fruit conductor and not in the cutter.

U.S. Pat. No. 4,060,962: A pair of scissor like cutting blades in the shape of pliers project outwardly of the device and are actuatable by a solenoid.

U.S. Pat. No. 4,099,367: A fruit container is pivotally connected to scissor means which project outwardly of the device. A crimping member with a cutting edge is moved against the cutting edge of a stationary member. The container pivots upwardly when the movable scissor member is actuated which indicates that the device is primarily intended to be used on low trees or bushes, since the container itself blocks the view of fruit if it is pointed upwards at a relatively steep angle.

U.S. Pat. No. 4,154,048: A pole has an attachment secured at the upper end thereof. The fruit picker includes two cutting members, one of which is movable by a hydraulic master assembly.

FIELD OF THE INVENTION

The field of art to which the present invention pertains includes the field of fruit pickers and, more especially, of hand-held fruit pickers mounted on the end of an elongated member, for detaching fruit which cannot be easily reached by hand, in combination with means for catching the severed fruit and storing it before discharging it into larger collection receptacles. References of interest include U.S. Pat. Nos. 64,472; 296,514; 351,824; 850,355; 1,223,601; 2,406,055; 3,559,387; 3,398,038; 4,060,962; 4,099,367 and 4,154,048.

CROSS REFERENCE TO RELATED APPLICATIONS

The present application relates to U.S. Pat. No. 4,095,399 filed by Richard J. Faulconer on Mar. 3, 1977, Ser. No. 756,178 and issued on June 20, 1978.

The present invention and the above patent are related in that both employ a common type of fruit picker which has a remotely operable cutter at one end of a fruit conducting elongated tube, and means for discharging fruit through the opposite end of the tube. Both types of fruit pickers comprise means for retarding the speed at which the fruit falls through the tube.

While U.S. Pat. No. 4,095,399 meets all objections of prior art, it has become apparent from field trials of the apparatus of the previous patent that some of the components can be reduced in number or simplified without detracting from the overall utility of the fruit picker. The simplified version of the apparatus decreases the amount of energy required for its manufacture and, concomitantly, the cost to the purchaser, and also allows the easy and economic replacement of individual parts. The invention, according to the above-identified co-pending application maintains the highly desirable features of the fruit picker of U.S. Pat. No. 4,095,399 while adding several improvements as described herebelow.

The discharge of fruit which, according to U.S. Pat. No. 4,095,399 required a pivotable cover member, is effected in the co-pending application through a detachably mounted flexible chute with an open bottom. The latter can be manually closed, so that during the harvesting operation the chute becomes in effect a temporary pocket for the storage of fruit. This construction dispenses with several mechanical components, such as the cover member for the lower end of the tube and attachment means therefor, a separate handle with a pivotable lever and connecting means between the lever and the cover member to actuate the latter.

According to another feature of the co-pending application the tube wall is pierced by a plurality of perforations which have the dual function of reducing the weight of the tube and of anchoring segments of fiber rope which criss-cross the bore. This construction has the advantage over the baffles of the previous patent in that twigs and leaves can fall through the tube past the rope segments instead of causing an obstruction which is difficult to remove from the tube interior.

Furthermore, a single pivotable knife, movable across a fruit-stem supporting slit in a plane perpendicular to the tube axis is substituted for a pair of knives which, in the operating position project outwardly and co-linearly with the tube axis.

A drawback of the fruit picker of the above identified co-pending application is that considerable manoeuvering is required in the thick foliage common to many fruit trees, to expeditiously guide fruit stems into the slit which severely diminishes the attraction of the device as a time and labor saving means.

Another drawback is is that the construction of the fruit picker is designed for a right-handed operator, and that changes in the placement of several components would have to be made for left-handed operators. It is, therefore, the principal object of my present invention to overcome these latter disadvantages and to provide an improved fruit picker which extends the principles originally set forth in my aforementioned co-pending application.

BACKGROUND AND SUMMARY OF THE INVENTION

The labor-intensive features inherent in fruit picking operations by means of a hand-held fruit picker make it desirable to provide an apparatus which maximizes the operator's productivity while minimizing damage to the fruit as well as to the fruit trees. These requirements are only inadequately met in prior art. A number of conventional hand-held fruit pickers do not provide receptacles for the newly picked fruit; once it has been detached from a tree, the fruit is made to fall to the ground at the risk of being bruised or squashed in the process. Other prior art fruit pickers include receptacles which depend from a pole on which the fruit detaching means are mounted. The uneven weight distribution caused by the presence of fruit in such receptacles makes it difficult for the operator to balance the pole, particularly in the dense foliage typical of many fruit trees. Another drawback is that such receptacles can be emptied only by pouring or lifting the fruit therefrom which is time consuming and, moreover, involves considerable stooping and bending. In yet another embodiment of prior art fruit cutting means project outwardly from a fruit conducting tube and are actuatable by manipulation of relatively complicated devices mounted on the tube. The construction of such apparatus increases its weight as well as its contour, is more expensive to manufacture and operate and results in an economically unfavorable product. In still another embodiment a fruit picker is disclosed in which the cutting means are fixedly attached to a rigid fruit-conducting tube. Since tree-grown fruit varies considerably in size, for example from grapefruit to plums, such tubes cannot easily be adapted for different species and are therefore of limited use for orchardists with mixed plantings.

The present invention intends to overcome the deficiencies of prior art by providing a simple, light-weight device which is easy to operate and to keep in operating condition, and which can be produced at a price that the small-orchard owner can afford to pay. Accordingly, a hand-held fruit picker is disclosed which comprises a rigid, elongated tube with an inlet end that is surmounted by a cylindrical lattice cage of substantially the same diameter as that of the tube, and an outlet end to which a flexible chute with an open, manually closable bottom, is attached. The lattice cage is formed from a plurality of elongated ribs, preferably made of flat metal strips, which are circumferentially spaced and held in place around the inlet end of the tube by annular metal bands to which they are attached at non-adjacent junction points. The cage has a cover portion which is defined by the upper portions of the ribs that are deflected through an angle 90 degrees and connected to the arms of a stellate cover plate.

A knife with a pair of blades at diametrically opposite sides of the shank is reciprocally slidable in the plane of the cage cover. In the non-operating position of the fruit picker the blades are spaced apart from bladeguards disposed on opposite sides of a notch that is formed in the cover portion, and define therebetween a pair of outwardly opening channels in which fruit supporting stems are introduced prior to cutting.

A handle for carrying the fruit picker is attached to the exterior of the tube and includes a pivotable lever which is spaced from the handle a distance such that both may be gripped in one hand. A rod, pivotally mounted in a plane that is parallel to the cage cover is linked to the lever. Squeezing of the lever against the handle thrusts one end of the rod against a slidable knife support which is mounted on the cover plate. The knife and the knife support, at right angles to each other linearly retracting under the momentum of the rod, cause the blades to move retreatingly across the channels and into the bladeguards, slicing along the way through any fruit stems held in the channels. The detached fruit drops through the open inlet into and through the tube and comes to rest in the chute at the bottom. A pair of springs which connect the knife shank and the cover plate are expanded during the knife's retraction. Upon release of the lever squeeze the rod's momentum is stopped, and the contracting springs advance the knife again to its non-operating position.

Perforations of generally circular shape are circumferentially distributed along the tube wall to reduce the weight of the fruit picker. Another group of perforations of smaller diameter are aligned in diametrically opposite rows along the tube length and anchor segments of a fiber rope which are passed through the interior of the tube. The series of spaced apart rope segments in the tube bore are designed to retard the speed of travel of the detached fruit through the tube.

Other advantages of the present invention, both as to its construction and mode of operation, will be readily appreciated as the same becomes better understood by reference to the following detailed description when considered in connection with the accompanying drawings in which like reference numerals designate like parts throughout the figures.

DETAILED DESCRIPTION

Figures 1, 3, 4:
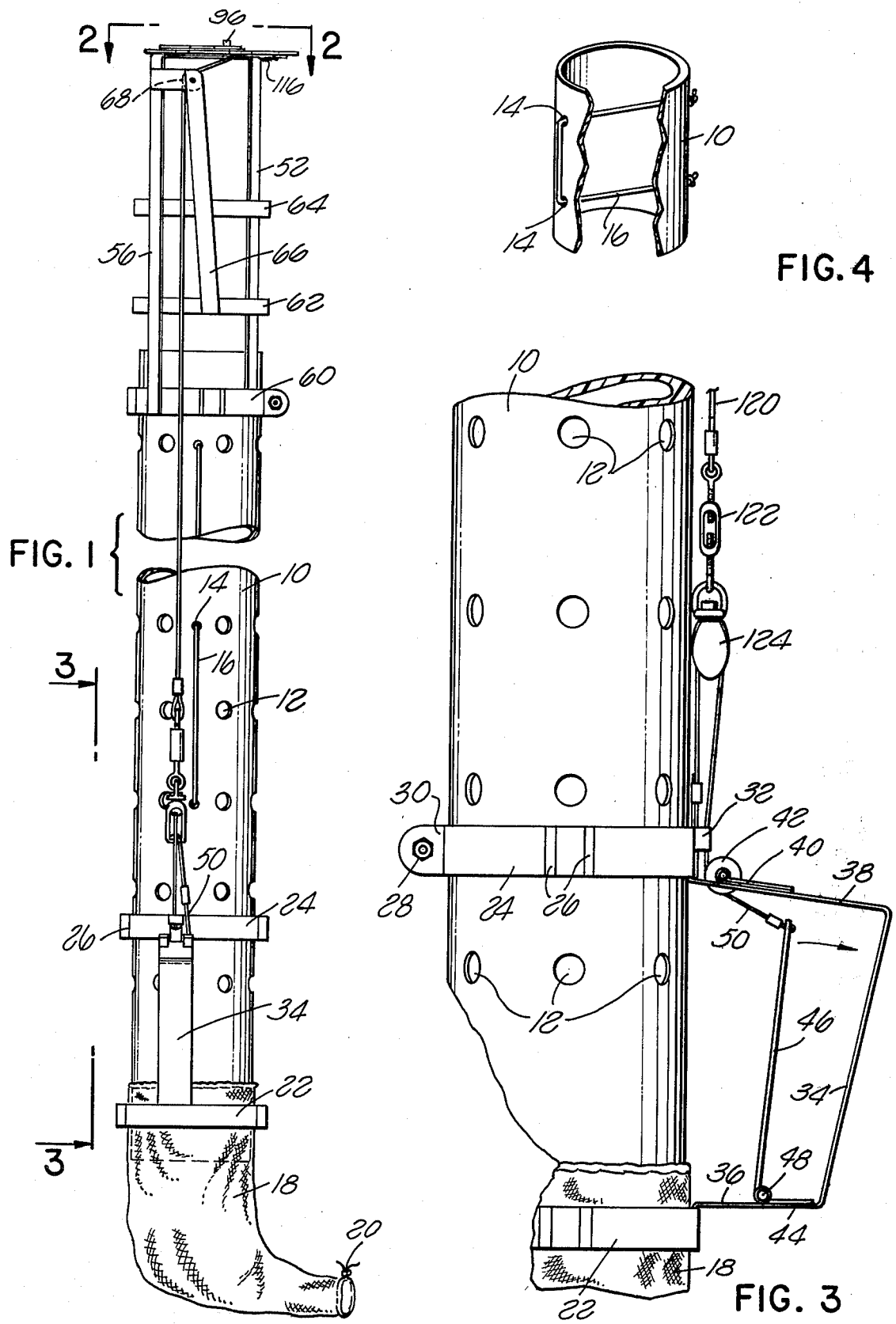
FIG. 1 is a schematic front elevational view of the fruit picker in accordance with the present invention.
FIG. 3 is a side elevational view taken along the line 3—3 of FIG. 1.
FIG. 4 is a perspective view, partly broken away, of a detail shown in FIG. 1.

Referring to FIG. 1, there is shown a hand-held fruit picker comprising an elongated tube 10 with an open inlet and outlet at opposite ends. The tube 10 is a rigid member, preferably made of lightweight plastic material, and may be of any convenient length and diameter, depending on the height of specific fruit trees and the size of specific fruit. In a preferred embodiment the diameter of the tube is slightly larger than that of the fruit, so that the latter, admitted through the inlet, can easily pass through the tube.

The wall of the tube 10 is pierced by a plurality of substantially circular perforations 12 of relatively large size, as well as by perforations 14 which are smaller. The perforations 12 are circumferentially spaced along the entire tube length and are adapted to reduce the weight of the fruit picker without reducing the rigidity or stability of the tube. The perforations 14 are linearly spaced along the tube wall in two diametrically opposite rows and anchor segments of a fiber rope as shown in FIG. 4. A fiber rope segment 16, having one knotted end at the exterior of the tube 10, is led, by its other end, into the tube through one of the perforations 14, out of the tube through another one of the perforations that is diametrically opposite, and re-introduced into the tube at a different level through yet another one of the perforations. Crossing the tube bore once more, the fiber rope 16 emerges through a fourth perforation 14 and is loosely secured by a knot at the tube exterior. A plurality of rope segments 16, similarly disposed throughout the length of the tube, provide a series of parallel obstructions in the bore which slow the descent of the fruit, while permitting twigs or leaves to fall down without blocking the interior of the tube. The knots can be re-tied to change the tension in the rope segments, depending on the weight of the fruit that is to be slowed down. The array of the segments, as illustrated and described, is shown by way of example only, it being understood that different configurations may be provided within the spirit and scope of the present invention.

A chute 18, demountably attached to the outlet end of the tube 10, has an open bottom which can be closed off by conventional means such as a drawstring 20. The chute 18 is preferably made of flexible material, so that it can be swung out of the way for easier handling.

Another advantage of a flexible chute is that during the unloading process the tube 10 need not be held above a packing box or another container on the ground, but may be deposited at an angle thereto while the fruit drops out of the depending chute.

The mouth of the chute 18 is pulled over the exterior of the tube and is held tight thereagainst by a clamping band 22 which is of identical construction as another clamping band 24, shown in detail in FIG. 3. The bands 22 and 24, preferably made of flat metal members, comprise a plurality of pressure equalizers 26, and are clamped around the exterior tube wall by bolts 28, passed through aligned apertures in a pair of parallel flanges 30 at the respective ends of the bands. The bolts 28 are fastened by conventional means such as nuts. A rigid sleeve 32 is attached to the band 24, parallel with the direction of the tube bore.

A U-shaped handle for carrying the tube is mounted on the exterior tube wall and comprises a handhold portion 34 with two integral brackets 36 and 38 at opposite ends. At its free end the bracket 36 is attached to the band 22, whereas the slotted free end of the bracket 38 is attached to the band 24. A re-inforcing stay 40 overlies a portion of the bracket 38 and includes, in the region of the bracket's slotted end, a pair of tubular projections forming supports for the shaft of a roller 42 which is rotatably mounted in the slot. A lever has one arm 44 mounted on the bracket 36 parallel therewith, and another arm 46 which is pivotable about hinge means 48. One end of a wire rope 50 is secured in an aperture in the free end of the lever arm 46. The rope is preferably made of air craft cable and constitutes part of a linkage system between the lever arm 46 and a fruit cutting knife at the top of the fruit picker as will be described hereinafter. The lever arm 46 is spaced from the handhold 34 a distance such that both may be gripped in one hand, (FIG. 3).

Proximate its inlet, the tube 10 is surmounted by a lattice cage which has a central core that is a continuation of the tube bore. The lattice cage is comprised of four elongated members forming ribs, designated by the numerals 52, 54, 56 and 58 respectively. The ribs which are made preferably of flat metal strips, are circumferentially spaced around the tube and define a hollow cylindrical structure with a cover portion that is perpendicular to the tube and cage axes. At their lower ends the ribs 52, 54, 56 and 58 are attached to a clamping band 60 which encompasses the tube 10 proximate its inlet, and which is of the same construction as the bands 22 and 24. At their opposite ends the ribs are deflected by an angle of 90 degrees and pointed toward the center of the tube bore. Annular, spaced apart bands 62 and 64, which are parallel to one another as well as to the clamping bands 22, 24 and 60, brace the ribs at four non-adjacent junction points. An L-shaped rib 66, made from a double layer of flat metal strips, has one elongated leg attached at its free end to the band 62 and one short leg that is attached to the upper end of the rib 54. In the region of the short leg the two layers are spread apart and rotatably accommodate therebetween a roller 68.

In the plane of the lattice cage cover the bent portions of the ribs 52, 54, 56 and 58 are connected to a substantially stellate flat metal plate which is formed of two adjacently disposed lamellas 70 and 72, and which comprises a plurality of outwardly radiating arms designated by the numerals 74, 76, 78, 79 and 80. The end portions of the ribs 52 and 54 are received between the tapered end portions of the plate arms 74 and 76 respectively and define therewith two sides of an outwardly opening notch with an apex proximate the center of the cover portion. The end portions of the ribs 56 and 58 are connected to the plate arms 78 and 79 respectively. An opening intermediate the forked end of the arm 80 is transformed into an elongated slot 82 by a cross bar 84 attached to the outer end portion of the arm which is disposed co-linearly with the bi-sector of the notch. The lamellas 70 and 72 are held together by through bolts 86, respectively 88, disposed at the outer ends of the arms 78 and 79 and by corresponding bolts 90, respectively 92 passing through the arms 74 and 76. All the bolts comprise washers on their bearing surfaces and appropriate fastening means such as nuts.

A fruit cutting knife has a shank 94 aligned with the arm 80 and inserted between the lamellas 70 and 72 of which the arm is composed. The shank projects outwardly from the forked end of the arm, as well as from the opposite end. A bolt 96 is passed through an opening in the shank (not shown) and the slot 82 of the encompassing arm 80 and slidably connects the shank to the cover portion of the lattice cage. At its forward end portion the shank 94 comprises a pair of triangular blades 98, respectively 100 with cutting edges 102, respectively 104, projecting laterally and symmetrically from the shank, in a configuration which parallels the triangular shape of the notch. One side of each of the co-planar blades 98 and 100 comprising their cutting edges 102 respectively 104, faces one of the arms 74, respectively 76 at opposite sides of the notch and defines therewith and outwardly open channel 106, respectively 108, for the introduction of fruit supporting stem portions prior to the cutting operation. At the portions of the arms 74 and 76 which confront the channels 106 respectively 108, the lamellas 70 and 72 are spread apart so as to form elongated apertures of bladeguards. The distance between the cutting edges 102 and 104 and the center of the bladeguards, demarcated by the bolts 90, respectively 92, is proportional to the length of the slot 82. The forwardly facing sides of the blades 98 and 100 are jointly fronted by an edging 110.

A cross bar 112 including apertures at opposite ends is attached to the shank 94 projecting rearwardly from the arm 80. Coil springs 114 and 116 respectively, are attached symmetrically at one of their ends to the apertures in the cross bar, and at the other of their ends to the bolts 90, respectively 92 at the underside of the lamella 72. A rod 118, pivotally mounted on the bolt 88, is movable in a plane intermediate the lamella 70 and the knife shank 94. The rod has a tapered front portion which is juxtaposed with the stem of the bolt 96, and an end portion which includes an aperture that serves as a location for the attachment of one end of a wire rope 120. Like the wire rope 50, the rope 120 is preferably made of aircraft cable. Its opposite end is guided over the roller 68 and is connected to the upper portion of a turnbuckle 122 that is adapted to take up the slack which may lengthen ropes during use. A housing 124 for a pulley (not shown) depends from the lower end of the turnbuckle. The wire rope 50, attached to the lever arm 46 and guided underneath the roller 42, is ascendingly led through the slot in the bracket 38 and the sleeve 32 and looped around the pulley in the housing 124. Descending again, the end of the wire rope is tied in a sling around the band 24 and fastened by conventional means. In this way the lever 46, mounted in the handle of the tube, is linked to the movable components at the top of the fruit picker.

Figure 2:
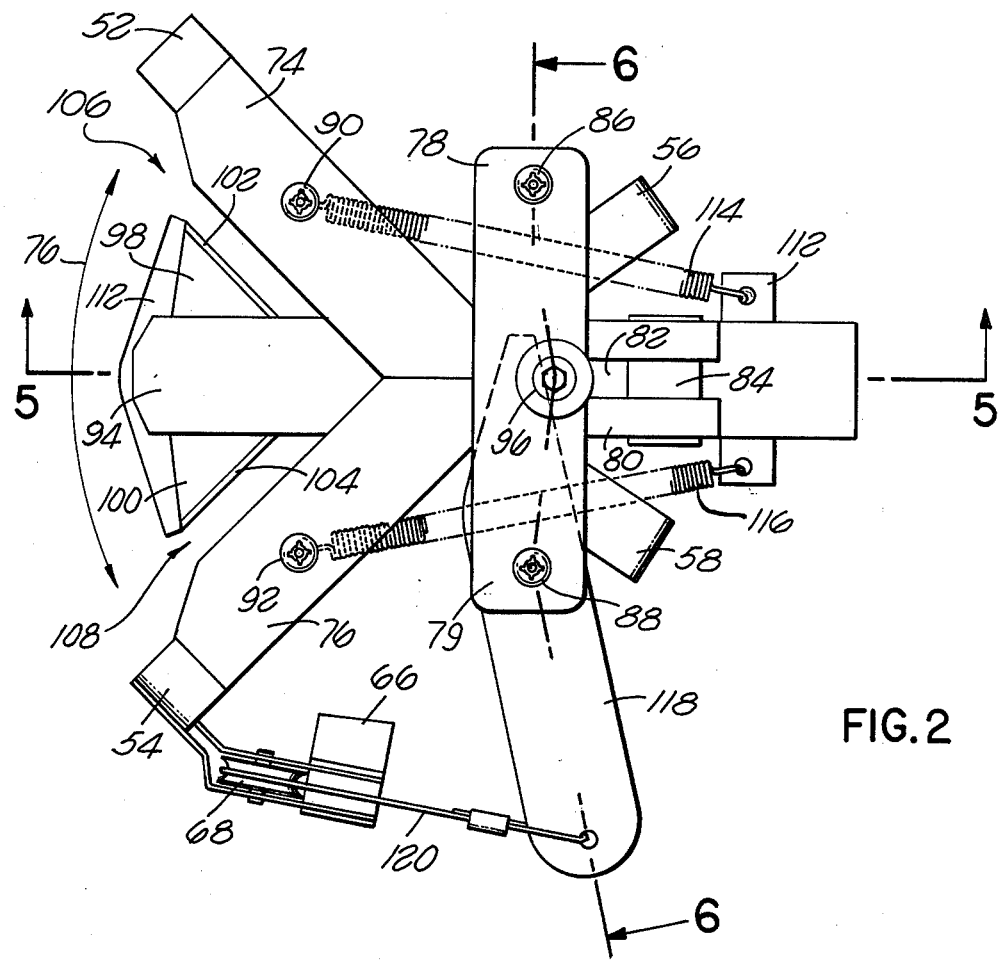
FIG. 2 is a plan view of a detail shown in FIG. 1, taken along the line 2—2 of FIG. 1.
Figure 5:
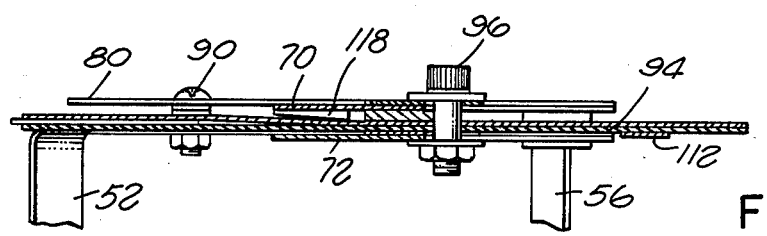
FIG. 5 is a cross-sectional view of a detail shown in FIG. 2, taken along the line 5—5 of FIG. 2.
Figure 6:
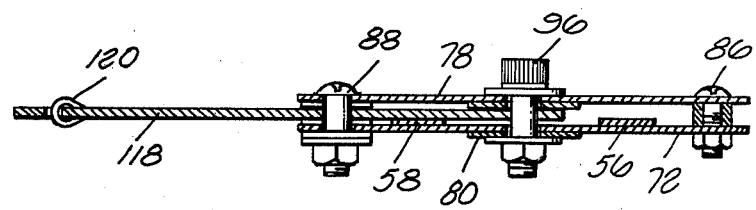
FIG. 6 is another cross-sectional view of a detail shown in FIG. 2, taken along the line 6—6 of FIG. 2.

Prior to a fruit picking operation on the springs 114 and 116 hold the shank 94 in a position in which the bolt 96 is disposed at the forward end of the slot 82, proximate the center of the cover, and in which the channels 106 and 108 are open. An operator, pointing the fruit picker toward a tree, can thus introduce fruit supporting stems into one of the channels. As he squeezes the lever arm 46 against the handhold 34, the motion is transmitted to the rod 118. As shown in FIG. 2, the rod executes a clockwise arcuate movement and pushes the stem of the bolt 96 rearwards toward the boundary of the slot 82, against the cross bar 84. The retreat of the bolt and of the knife shank 94 to which it is attached, pull the cutting edges 102 and 104 of the blades 98 and 100 across the channels 106 and 108 and into the bladeguards at the opposite sides of the channels. Simultaneously the springs 114 and 116 are expanded. Severed from the stems that were held in the channels, the cut fruit drops into the tube 10 and, decelerated by the segments of fiber rope 16, continues its descent into the chute 18. Upon release of the squeeze the springs 114 and 116 contract and restore the knife into its non-operating position in which the blades are spaced away from the bladeguards, and in which the channels 106 and 108 are again open.

The fruit picker, as described and illustrated, is economical in terms of the material used and with regard to the repair and replacement of parts. The disposition of the notch and the placement of the handle facilitate the fruit picking operation. The constraints which force the knife blades to cut the fruit stems during a retreating movement and to remain in alignment with the respective bladeguards prevent damage to the fruit which would occur if the knife were able to move up and down and press against the skin of fruit whose stem is held in one of the channels. The cutting edges, slanted rearwardly from the frontal edging 110 are protected against accidental denting or blunting which is a hazard to an exposed blade. The limited path of retreat of the knife, defined by the length of the slot 82 prevent an unnecessary application of force and expansion of the springs which would occur if the knife were able to move through a greater distance. The open lattice frame allows an operator to sight fruit on a tree and to guide the knife into position.

The arrangement, in accordance with the invention, which provides for two identically shaped blades and two channels for the introduction and immobilization of fruit stems not only reduces the amount of manipulation required to pick fruit off a tree or bush but permits ease of operation by right-handed as well as by left-handed operators without structural or positional changes in the components of the fruit picker.

I claim:
1. A fruit picker comprising
an elongated tubular member having an inlet and an outlet at opposite ends thereof defining a bore therethrough, and a plurality of perforations in the wall surrounding said bore;
a handle affixed to the exterior of said tubular member, and a lever mounted on said handle and spaced therefrom a distance such that said handle and said lever may be gripped in one hand and the lever squeezed toward the handle;

a cover member mounted on said tubular member in overlying relation to said inlet and having an outwardly opening notch;

at least one bladeguard formed on one side of said notch;

a knife comprising a shank and at least one blade confronting said bladeguard, and means mounting said knife on said cover member for reciprocal slidable movement of said knife in a plane normal to the axis of said tubular member along a line bisecting said notch;

force transmitting means linking said lever and said knife mounting means for moving said knife from a first position wherein said blade is spaced from said bladeguard into a second position wherein said blade is received in said bladeguard upon actuation of said lever; and resilient means connecting said knife and said cover member for moving said knife from said second to said first position upon release of said lever.

2. The fruit picker according to claim 1, wherein said cover member comprises a double-layered, substantially stellate plate having a plurality of outwardly radiating arms joined to said deflected end portions of said ribs, and wherein two of said arms define said notch therebetween.

3. The fruit picker according to claim 2 wherein said double-layered plate is spread apart along at least one of said arms defining said notch to form a bladeguard thereon comprising an elongated aperture facing said notch.

4. The fruit picker according to claim 2 wherein said shank has a perforation therethrough and is inserted between said layers of one of said arms comprising an elongated slot therethrough, and wherein a bolt is passed through said perforation and said slot to join said shank and said arm.

5. The fruit picker according to claim 4 wherein said bolt positioned at one end of said slot proximate the center of said cover member when said knife is in said first position, and at the other end of said slot proximate the outer end of said arm when said knife is in said second position.

6. The fruit picker according to claim 5 wherein the length of said slot is proportional to the distance between said blade and the center of said bladeguard.

7. The fruit picker according to claim 4 wherein said rod is pivotable about its center and comprises one tapered end portion juxtaposed with the stem of said bolt and an opposite end portion linked to said lever.

8. The fruit picker according to claim 1 wherein at least one fiber rope is disposed across said bore between a pair of diagonally spaced apart perforations and adjustably secured thereagainst at the exterior of said tubular member.

9. The fruit picker according to claim 1 wherein a plurality of fiber ropes are disposed across said bore throughout the length of said tubular member, each of said ropes being guided through a pair of spaced apart perforations and adjustably secured thereagainst at the exterior of said tubular member.

10. The fruit picker according to claim 9 wherein said fiber ropes are disposed parallel to one another.

11. The fruit picker according to claim 1 wherein said force transmitting means comprise a rod pivotally affixed intermediate its respective ends to said cover member, and a wire rope connecting one end of said rod to said lever for movement of the other end of said rod against said knife mounting means upon actuation of said lever, whereby said knife is moved from said first to said second position.

12. The fruit picker according to claim 1 wherein a portion of said tubular member proximate said inlet is formed as a lattice cage.

* * * * *